Dec. 8, 1953   J. E. KENNEDY   2,661,813
LUBRICATING MEANS FOR TUBE MILLS
Filed June 10, 1948   2 Sheets-Sheet 1
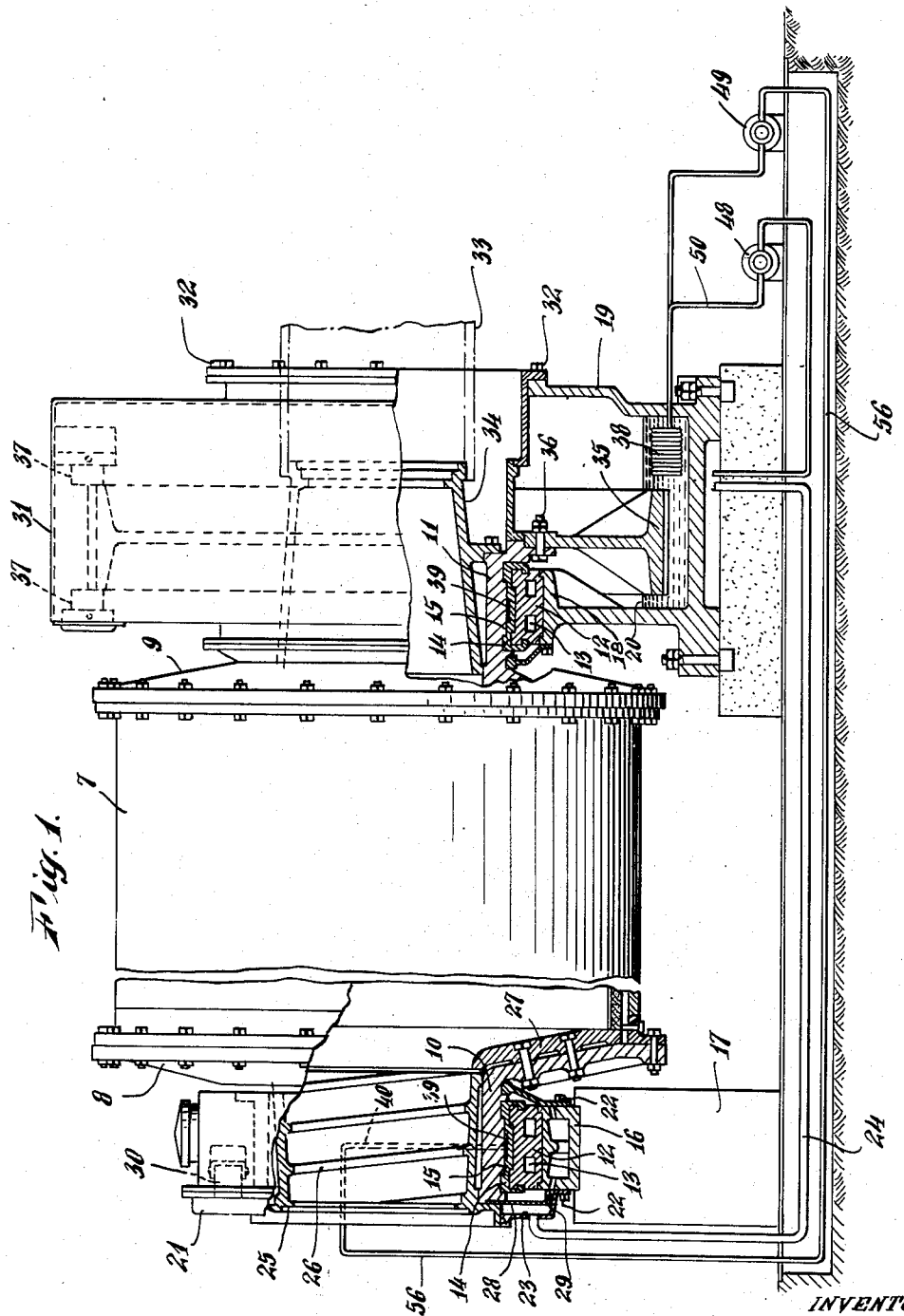
INVENTOR.
BY  J. E. Kennedy
John A. Seifert
ATTORNEY.

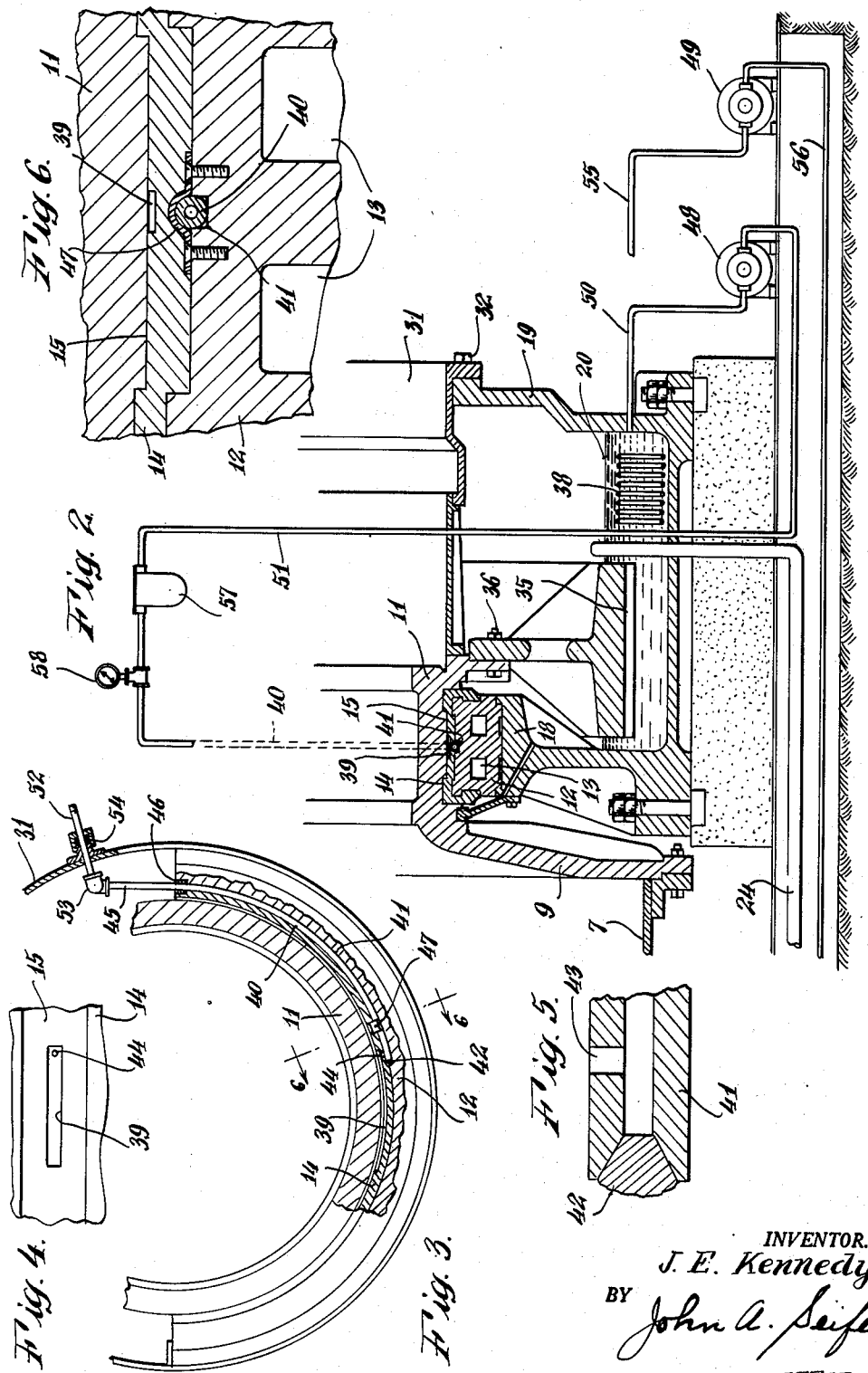

Patented Dec. 8, 1953

2,661,813

UNITED STATES PATENT OFFICE 2,661,813

LUBRICATING MEANS FOR TUBE MILLS

Joseph E. Kennedy, New York, N. Y.

Application June 10, 1948, Serial No. 32,212

2 Claims. (Cl. 184—6)

This invention relates to the lubrication of tube mills including a drum having hollow trunnions axially at the opposite ends to rotatably support the drum in bearings of supports for the drum. The material to be reduced is fed into the drum through one of the trunnions and is reduced in the drum as the drum is rotated by the impact and the attritive action of freely moving elements therein. The reduced material in the drum is delivered therefrom through the other trunnion in suspension in an air stream.

This application is a continuation-in-part and improvement over my copending application Ser. No. 600,561, filed June 20, 1945, for "Improved Tube Mill," issued as Patent No. 2,486,477, on November 1, 1949.

Due to the weight of the drum on each bearing, which is approximately 138,000 pounds in a drum 10 feet in diameter and 18 feet long, it requires a great amount of power to start the rotation of the drum.

It is the object of the invention to provide a force feed lubricating system which will reduce the friction between the drum trunnions and the bearings and reduce the amount of power required to start the rotation of the drum.

It is another object of the invention to provide supports with wells for carrying lubricant, one of said wells carrying a supply of lubricant and the other well being at a higher level than and connected in communication with the first well to return excess lubricant thereto, and means to force feed the lubricant from the first well to the bearings of both supports to lubricate said bearings and lift and support the trunnions therefrom, the excess lubricant in the bearings flowing into the wells of the respective supports.

It is a further object of the invention to provide each bearing and trunnion with a tongue and groove engagement to prevent an undue amount of lubricant leaving the bearing and separating the bearing surface from the support therefor.

Another object of the invention is to provide each bearing with a lubricant receiving groove in the bearing surface extending circumferentially of the bearing and at the vertical center thereof and connected in communication with the means to force feed the lubricant from the lubricant supply well to the bearing.

Further objects and advantages of the invention will appear in the detailed description of the invention.

In the drawings accompanying and forming a part of this application, Figure 1 is a side elevational view of a drum of a tube mill, partly in section, showing the bearing supports for the drum trunnions connected in communication with a force feed lubricating system.

Figure 2 is a fragmentary longitudinal sectional view, on an enlarged scale, of the bearing at the discharge end of the tube mill to show in greater detail the lubricating system thereof.

Figure 3 is a fragmentary cross sectional view of a bearing and drum trunnion.

Figure 4 is a fragmentary plan view of a bearing showing a lubricant receiving groove therein.

Figure 5 is a sectional view of the lubricant delivery end of a conduit arranged in the bearing to connect the lubricant receiving groove in communication with the lubricant feeding means.

Figure 6 is a cross sectional view, on an enlarged scale, taken on the line 6—6 of Figure 3 looking in the direction of arrows to show the mounting of the lubricant connecting conduit.

The embodiment of the invention is shown in connection with the drum of a tube mill of usual construction including a cylindrical body 7 and heads 8 and 9 secured to the ends of said body. The heads 8 and 9 have axial trunnions 10 and 11, respectively, extending laterally therefrom to rotatably support the drum in bearings. Each bearing comprises a semi-circular steel member 12 having chambers 13 for the circulation of a cooling medium, and a bearing lining covering the bearing surface and anchored in the sides of the member 12, as shown at 14 in Figures 1 and 2. In the present embodiment of the invention, each trunnion is arranged with an annular ridge or tongue to engage a corresponding recess or groove in the bearing lining, as shown at 15, for a purpose to be hereinafter described.

The bearing member 12 supporting the drum trunnion 10 is secured in a semi-circular support 16 mounted on a foundation pillar 17, as shown in Figure 1. The bearing member 12 supporting the drum trunnion 11 is secured in a semi-circular seat portion 18 arranged in a side wall of a support in the form of a well 19 containing a desired amount of lubricant, as indicated at 20.

The drum trunnion 10 and bearing 12—15 therefor are enclosed by a hood 21 mounted on the support 16, as indicated at 22 in Figure 1, and forming a well 23 at the lower portion thereof to receive excess lubricant from the bearing 12—15. The well 23 is connected in communication with the well 19 through a pipe 24, the lubricant, such as mineral oil, flowing by gravity from the well 23 to the well 19, as the well 23 is at a higher elevation than the well 19. A sleeve 25 having a material feed screw 26 on the interior face is secured in the trunnion 10 in abutting relation to an annular lining member 27 of wear resisting material disposed relative to the inner face of the head 8 and secured to said head, as shown in Figure 1. The trunnion 10 is provided with means to lift lubricant from the well 23 and distribute it over said trunnion and bearing. This means comprises an annular plate 28 having a lateral flange 29 at the outer periphery and secured to the drum trunnion 10 at the inner periphery of the annular plate, as shown in Figure 1. The lubricant adhering to the plate is removed therefrom by a sweep pivotally supported by the hood 21, as shown in dotted lines at 30 in Figure 1.

The drum trunnion 11 and bearing 12—15 therefor are enclosed by a hood 31 mounted on the well 19, as shown at 32. Through the drum trunnion 11, the drum 7 is connected to means, such as a fan not shown, to induce a flow of air into and from the drum with reduced material in suspension discharged through said trunnion. This is accomplished by a conduit, shown in dot and dash lines 33, extended through a center opening in the hood 31 and connected to a sleeve 34 mounted in the trunnion 11, as shown in Figure 1.

The drum is rotated from a suitable source of power operatively connected to a gear 35 secured, as at 36, to the drum trunnion 11 with the teeth passing through the lubricant in well 19, whereby the rotation of the gear 35 will lift the lubricant in well 19 relative to sweeps pivotally supported by the hood 31 on opposite sides of the gear, as shown in dotted lines at 37 in Figure 1, to distribute the lubricant over the trunnion 11 and the bearing 12—15 therefor. The lubricant in well 19 may be cooled by a coil 38 connected in circulation with a source of a cooling medium.

It has been found that the distribution of the lubricant in the wells 23 and 19 by the lift 28, 29 and gear 35 over the trunnions 10, 11 and the bearings 12—15 does not overcome the frictional drag on the trunnions occurring in starting the rotation of the drum. It is the principal object of this invention to overcome this frictional drag by force feed lubrication of the bearings 12—15. In carrying out this object, each of the bearing surfaces of the linings 14 is provided with a groove 39 extending circumferentially of the center of the bearing surface and of the recess 15 therein. The groove 39 is also in the longitudinal center of the recess 15 as seen in Figure 4. The opposite ends of the groove 39 terminate equal distances from the transverse center of the lining and equal distances from the respective terminal sides or tops of the semi-circular bearing lining. In this construction, as shown in Figures 3 and 4, the distances between the ends of the grooves 39 and the respective terminal sides of the bearing lining are greater than the distances between the ends of the groove 39 and the transverse center of the bearing surface. The grooves 39 are each provided with a conduit for delivering lubricant thereto comprising a pipe 40 partly embedded in each of the bearing members 12 by being engaged in a groove 41 in each of said members 12 and the upper exposed portion of the pipe is covered by the lining 14. One end of the pipes 40 terminates adjacent one end of each of the grooves 39 and is closed in a suitable manner, as by welding as shown at 42 in Figure 5. Adjacent said closed end of each of the pipes 40, there is provided a discharge orifice 43 in the wall of the pipes in register with an opening 44 in each of the linings 14 terminating at the end portion of each of the grooves 39. Each of the opposite ends of the pipe 40 terminates at a side of each bearing and is connected to a short section of pipe 45 by a coupling member 46 in a recess in the lining 14 and bearing member 12, as shown in Figure 3. The pipes 40 are retained in proper position in the bearings 12—15 by clamping brackets 47 having a center portion encircling the portion of the pipes 40 covered by the linings 14 and the opposite end portions of said brackets secured to the bearing members 12, as shown in Figure 6. The pipes 40 are positioned in the grooves 41 and the brackets 47 are mounted in pipe securing position on the bearing members 12 before the linings 14 are applied to the bearing members 12.

Lubricant in the well 19 is force fed through the pipes 45, 40 to the grooves 39 by a pair of rotary circulating pumps 48, 49, the pump 48 having an inlet connected in communication with the lubricant in the well 19 through a conduit 50 having one end connected to the inlet of the pump and the opposite end terminating in the well 19 below the normal level of the lubricant therein. The outlet of the pump 48 is connected in communication with the short pipe 45 associated with the trunnion 11 by a pipe 51 connected at one end to the outlet of the pump 48 and having the opposite end connected to a pipe section 52 extended through the hood 31 and connected to the short pipe 45 by an angular coupling member 53, as shown in Figure 3. The entry of pipe section 52 into the hood 31 is sealed by a gasket 54 to prevent leakage of lubricant from the hood 31.

The inlet of pump 49 is connected in communication with the lubricant in the well 19 through a conduit 55 having one end connected to the inlet of pump 49 and the opposite end thereof extended into the well at the same level as the inlet end of conduit 50. The outlet of the pump 49 is connected in communication with the pipes 45, 40 and groove 39 of the bearing 12—15 supporting the trunnion 10 through a conduit 56 having one end connected to the outlet of the pump 49 and the other end connected to the pipes 45, 40 and groove 39 of the bearing 12—15 supporting the trunnion 10 in the same manner as conduit 51 is connected with the pipes 45, 40 and groove 39 of the bearing 12—15 supporting the trunnion 11.

The lubricant being delivered by the pumps 48 and 49 to the grooves 39 may be cleaned by interposing a filtering element 57 in the conduits 51 and 56, as shown in Figure 2 relative to conduit 51. The pressure at which the lubricant is delivered to the bearings 12—15 may be indicated by a pressure gauge mounted on and in communication with the conduits 51 and 56, as shown at 58 in Figure 2 in connection with conduit 51.

The lubricant delivered to the grooves 39 will flow longitudinally thereof and after said grooves are full of lubricant, the lubricant will flow laterally from the grooves in opposite directions, so that a uniform film of lubricant is formed between the linings 14 and the trunnions 10, 11 and said trunnions are lifted from the linings 14 and supported by said film of lubricant, which will greatly facilitate the starting of the drum. In practice it has been found that the drum will assume its equilibrium after lubricant has been pumped to the grooves 39 due to the weight of the material to be reduced and the reducing elements in the drum, which are usually at one side of the longitudinal axis of the drum.

The tongue and groove engagements 15 between the trunnions and the bearing linings will prevent an undue amount of lubricant flowing from the bearing linings which might loosen the anchorage of said bearing linings in the members 12.

The invention covered in this application constitutes an improvement over that disclosed in the applicant's copending application Ser. No. 45,073, filed August 19, 1948, as a division of application Ser. No. 600,561, the divisional application having been issued as Patent Number 2,632,529 on March 24, 1953.

Having thus described my invention, I claim:

1. In a support and lubricating means for tube mills of the type including a drum having hollow axial trunnions at its opposite ends rotatably supporting the drum in semi-circular bearings mounted in supports, the improvement in which at least one of said trunnions includes an annular ridge intermediate the ends of the trunnion and in which the semi-circular bearing supporting said trunnion is provided with a recess corresponding to and receiving the annular ridge of the trunnion, said ridge and recess having side walls extending substantially normal to the axis of the trunnion, said semi-circular bearing having a lubricant-receiving groove in its upper surface midway of the ends of the bearing and of the sides of the recess therein, said groove extending circumferentially of the center of the semi-circular bearing with the ends of the groove spaced a greater distance from the respective terminal sides of the semi-circular bearing than from the transverse center of said bearing, a conduit in said bearing having one end connected in communication with the lubricant-receiving groove in the bearing, and means connected in communication with the opposite end of said conduit adapted to feed lubricant under pressure through the conduit to the groove to fill the groove with lubricant and lift and support the drum trunnion by a film of lubricant flowing laterally from the groove in opposite directions over the upper surface of the bearing.

2. In a support and lubricating means for tube mills of the type including a drum having hollow axial trunnions at its opposite ends for rotatably supporting the drum, and a support for each drum trunnion arranged with a semi-circular bearing rotatably engaged by said drum trunnion and a well to receive excess lubricant from the bearing, the improvement in which each of said drum trunnions includes an annular ridge intermediate its ends and in which the semi-circular bearing supporting said trunnion is provided with a recess corresponding to and receiving the annular ridge of the trunnion, said ridge and recess having side walls extending substantially normal to the axis of the trunnion, each of said semi-circular bearings having a lubricant receiving groove in its upper surface midway of the ends of the bearing and of the sides of the recess therein, said groove extending circumferentially of the center of the semi-circular bearing with the ends of the groove spaced a greater distance from the respective terminal sides of the semi-circular bearing than from the transverse center of said bearing, the well for receiving excess lubricant from one of said semi-circular bearings being at a higher level than the well for receiving excess lubricant for the other bearing, means for conducting lubricant from the well at the higher level into the well at the lower level, a conduit in each of said semi-circular bearings having one end connected into the groove in said bearing, and means connected in communication with the opposite end of the conduit for each groove and with the lubricant well at the lower level for withdrawing lubricant therefrom and supplying lubricant under pressure through the respective conduits to the grooves in the respective semi-circular bearings to fill the grooves with lubricant and lift and support the drum trunnions by films of lubricant flowing laterally from the grooves in opposite directions over the upper surfaces of the semi-circular bearings.

JOSEPH E. KENNEDY.

References Cited in the file of this patent

UNITED STATES PATENTS

| Number | Name | Date |
|---|---|---|
| 692,982 | Capewell | Feb. 11, 1902 |
| 1,157,390 | Hewitt | Oct. 19, 1915 |
| 1,467,251 | Roos | Sept. 4, 1923 |
| 1,616,829 | Saybolt | Feb. 8, 1927 |
| 2,062,250 | Moller | Nov. 24, 1936 |
| 2,299,825 | Kennedy | Oct. 27, 1942 |

FOREIGN PATENTS

| Number | Country | Date |
|---|---|---|
| 722,148 | France | Dec. 28, 1931 |
| 331,734 | Germany | Jan. 14, 1921 |